(12) United States Patent
Schneider et al.

(10) Patent No.: US 9,248,799 B2
(45) Date of Patent: Feb. 2, 2016

(54) DUAL CUSHION AIRBAG WITH INDEPENDENT INFLATION

(71) Applicant: Autoliv ASP, Inc., Ogden, UT (US)

(72) Inventors: David W. Schneider, Waterford, MI (US); ChangSoo Choi, Rochester, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 14/294,405

(22) Filed: Jun. 3, 2014

(65) Prior Publication Data

US 2015/0343986 A1    Dec. 3, 2015

(51) Int. Cl.
*B60R 21/20* (2011.01)
*B60R 21/205* (2011.01)
*B60R 21/00* (2006.01)
*B60R 21/231* (2011.01)
*B60R 21/26* (2011.01)

(52) U.S. Cl.
CPC ....... *B60R 21/205* (2013.01); *B60R 2021/0044* (2013.01); *B60R 2021/0048* (2013.01); *B60R 2021/23107* (2013.01); *B60R 2021/26058* (2013.01)

(58) Field of Classification Search
CPC .............................................. B60R 2021/23107
USPC ......................................................... 280/729
See application file for complete search history.

(56) References Cited

U.S. PATENT DOCUMENTS

| | | | |
|---|---|---|---|
| 3,614,129 A | 10/1971 | Sobkow | |
| 3,642,303 A | 2/1972 | Irish et al. | |
| 3,768,830 A | 10/1973 | Hass | |
| 3,801,126 A | 4/1974 | Knight, IV et al. | |
| 4,262,931 A | 4/1981 | Strasser et al. | |
| 5,556,128 A * | 9/1996 | Sinnhuber et al. | 280/730.2 |
| 5,575,497 A | 11/1996 | Suyama | |
| 5,609,363 A * | 3/1997 | Finelli | 280/743.2 |
| 5,791,685 A | 8/1998 | Lachat et al. | |
| 5,803,485 A * | 9/1998 | Acker et al. | 280/728.2 |
| 5,853,191 A | 12/1998 | Lachat et al. | |
| 6,123,355 A | 9/2000 | Sutherland | |

(Continued)

FOREIGN PATENT DOCUMENTS

| | | |
|---|---|---|
| DE | 10146493 A1 | 4/2003 |
| EP | 2617607 A1 | 7/2013 |
| JP | 06024283 | 2/1994 |

OTHER PUBLICATIONS

International Search Report and Written Opinion for PCT/US2014/067283 mailed Feb. 20, 2015.

(Continued)

*Primary Examiner* — Nicole Verley
(74) *Attorney, Agent, or Firm* — Stoel Rives LLP

(57) ABSTRACT

An airbag assembly can comprise an inflation assembly to inflate a first airbag and a second airbag to deploy from a housing. The first airbag and the second airbag can receive inflation gas from the inflation assembly and deploy from a common housing. The inflation assembly can comprise a first inflator coupled to the first airbag and a second inflator coupled to the second airbag. Alternatively, the inflation assembly may comprise a dual-stage inflator coupled to each of the first airbag and the second airbag and configured to inflate each of the first airbag and the second airbag independently. A panel can couple together the first airbag and the second airbag.

16 Claims, 10 Drawing Sheets

(56) References Cited

U.S. PATENT DOCUMENTS

| | | | |
|---|---|---|---|
| 6,126,196 A | 10/2000 | Zimmerman | |
| 6,135,493 A | 10/2000 | Jost et al. | |
| 6,139,052 A * | 10/2000 | Preamprasitchai | 280/735 |
| 6,158,765 A | 12/2000 | Sinnhuber et al. | |
| 6,196,575 B1 | 3/2001 | Ellerbrok et al. | |
| 6,247,727 B1 | 6/2001 | Hamada | |
| 6,254,121 B1 | 7/2001 | Fowler et al. | |
| 6,308,983 B1 | 10/2001 | Sinnhuber | |
| 6,419,262 B1 * | 7/2002 | Fendt et al. | 280/729 |
| 6,786,505 B2 | 9/2004 | Yoshida et al. | |
| 6,971,664 B2 | 12/2005 | Amamori et al. | |
| 7,040,650 B2 | 5/2006 | Neupert et al. | |
| 7,261,320 B2 * | 8/2007 | Fredin et al. | 280/743.2 |
| 7,347,450 B2 | 3/2008 | Williams et al. | |
| 7,850,200 B2 | 12/2010 | Zauritz et al. | |
| 7,938,445 B2 | 5/2011 | Smith et al. | |
| 7,942,443 B2 | 5/2011 | Dennis et al. | |
| 7,988,188 B2 | 8/2011 | Zauritz et al. | |
| 8,186,713 B2 | 5/2012 | Fischer et al. | |
| 2003/0218325 A1 * | 11/2003 | Hasebe et al. | 280/743.2 |
| 2004/0046369 A1 * | 3/2004 | Michael et al. | 280/729 |
| 2004/0145161 A1 * | 7/2004 | Hasebe et al. | 280/729 |
| 2005/0029781 A1 * | 2/2005 | Enders et al. | 280/732 |
| 2005/0104339 A1 * | 5/2005 | Hasebe et al. | 280/729 |
| 2005/0184489 A1 * | 8/2005 | Kobayashi | 280/729 |
| 2005/0269808 A1 * | 12/2005 | Song et al. | 280/732 |
| 2006/0006631 A1 * | 1/2006 | Meissner et al. | 280/729 |
| 2006/0197324 A1 * | 9/2006 | Klinkenberger | 280/731 |
| 2006/0232050 A1 * | 10/2006 | Kumagai et al. | 280/730.1 |
| 2006/0284400 A1 * | 12/2006 | Sakakibara et al. | 280/728.2 |
| 2006/0290111 A1 * | 12/2006 | Kokeguchi | 280/729 |
| 2007/0126217 A1 * | 6/2007 | Nayef | 280/732 |
| 2007/0210565 A1 * | 9/2007 | Song et al. | 280/732 |
| 2008/0048420 A1 | 2/2008 | Washino | |
| 2008/0054602 A1 * | 3/2008 | Yang | 280/729 |
| 2008/0100041 A1 * | 5/2008 | Kim et al. | 280/728.2 |
| 2008/0179867 A1 | 7/2008 | Riedel et al. | |
| 2008/0308338 A1 | 12/2008 | Kitte et al. | |
| 2009/0121462 A1 | 5/2009 | Rick | |
| 2010/0066064 A1 * | 3/2010 | Kotikovsky | 280/728.3 |
| 2010/0252350 A1 | 10/2010 | Hayashi et al. | |
| 2011/0101660 A1 | 5/2011 | Schneider et al. | |
| 2011/0140398 A1 | 6/2011 | Song et al. | |
| 2012/0025497 A1 | 2/2012 | Yoo | |
| 2012/0200069 A1 | 8/2012 | Kato et al. | |
| 2012/0223550 A1 * | 9/2012 | Mazanek et al. | 297/216.1 |
| 2013/0001935 A1 * | 1/2013 | Nagasawa et al. | 280/731 |
| 2013/0087995 A1 * | 4/2013 | Lee et al. | 280/728.2 |
| 2014/0265271 A1 * | 9/2014 | Dinsdale et al. | 280/730.2 |
| 2015/0166002 A1 | 6/2015 | Fukawatase et al. | |
| 2015/0175116 A1 | 6/2015 | Cho et al. | |

OTHER PUBLICATIONS

Office Action mailed Dec. 5, 2014, in U.S. Appl. No. 14/099,928, filed Dec. 7, 2013.
Restriction Requirement mailed May 12, 2015, in U.S. Appl. No. 14/512,025, filed Oct. 10, 2014.
Office Action mailed May 21, 2015, in U.S. Appl. No. 14/099,928, filed Dec. 7, 2013.
International Search Report and Written Opinion for PCT/US2015/029615 mailed Sep. 23, 2015.

* cited by examiner

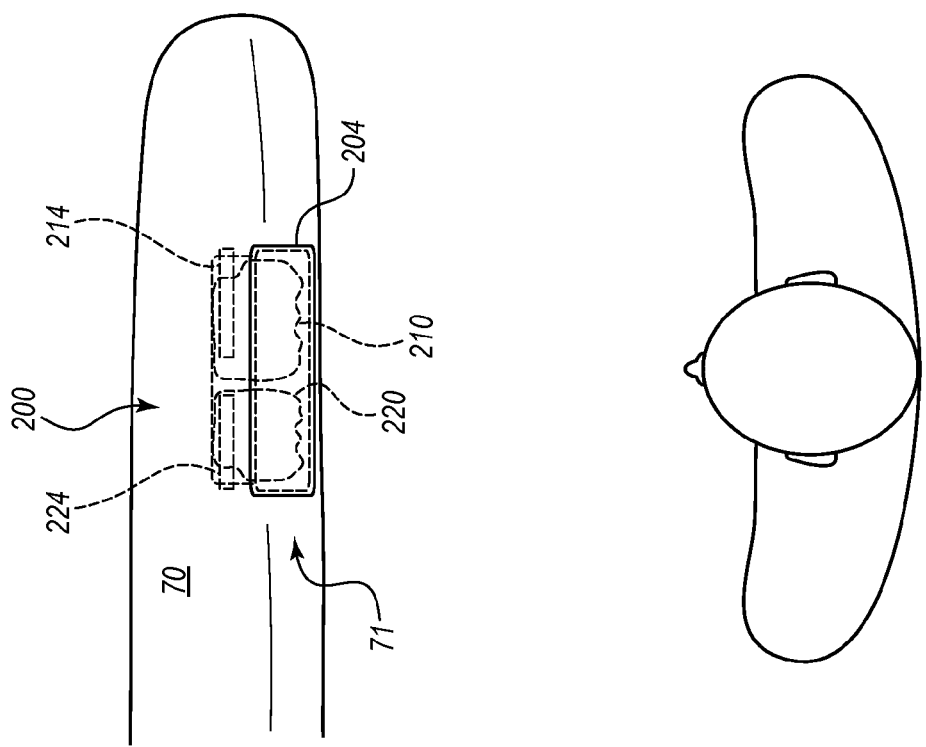

DUAL CUSHION AIRBAG WITH INDEPENDENT INFLATION

BACKGROUND

Inflatable airbags may be mounted within a vehicle and deploy during a collision event. The deployed airbag may cushion an occupant and prevent detrimental impact with other vehicular structures. Some airbags suffer from one or more drawbacks or may perform less than optimally in one or more respects. Certain embodiments disclosed herein can address one or more of these issues.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIG. 2 is a top plan view of an airbag assembly, according to another embodiment of the present disclosure, in a packaged state or storage state.

DETAILED DESCRIPTION

Figure 1:
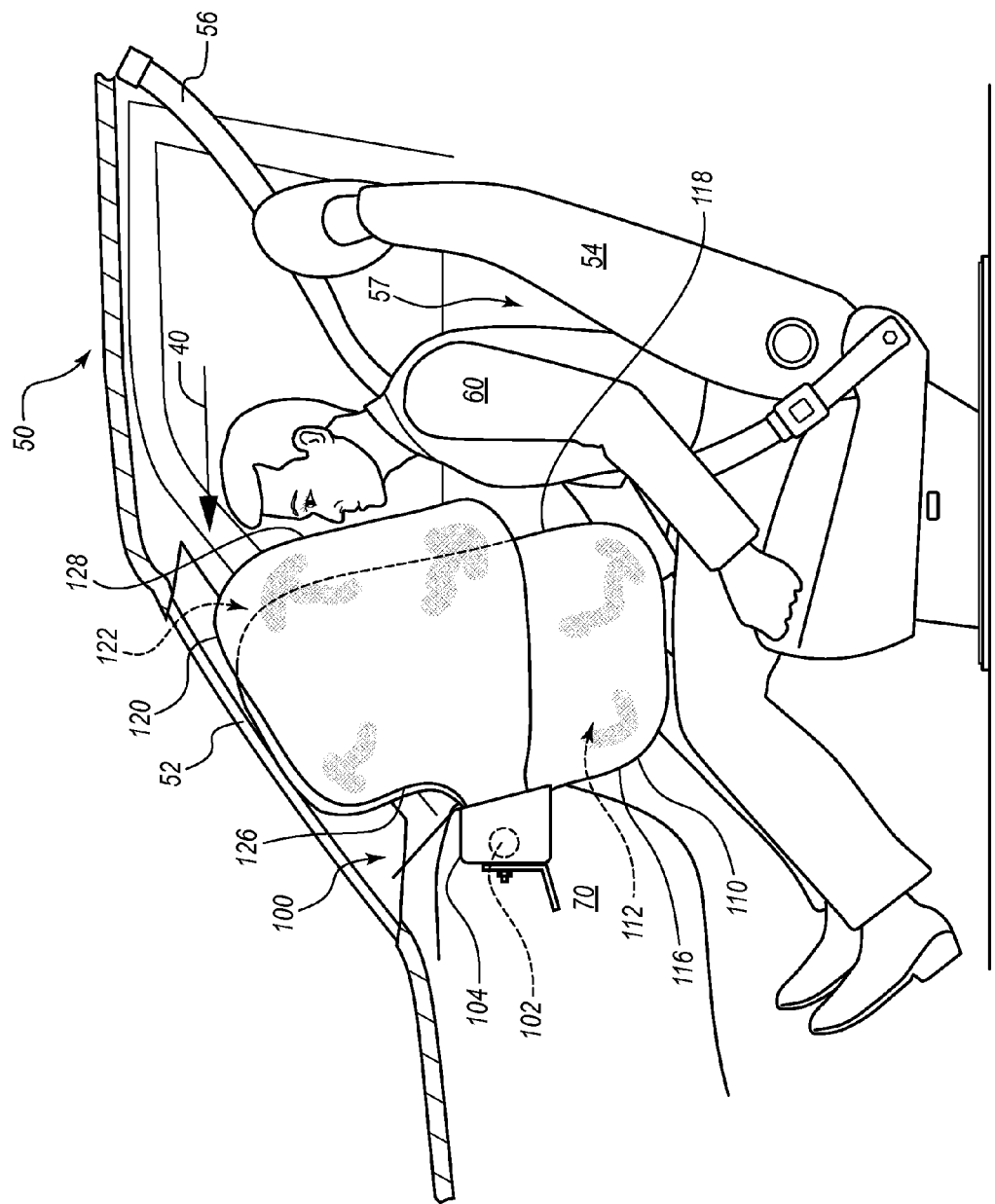
FIG. 1 is a side elevation view of an airbag assembly, according to one embodiment of the present disclosure, in a deployed state within a vehicle, and a vehicle occupant depicted moving toward the deployed airbag assembly in a direction of travel of the vehicle.

As can be readily understood, the components of the embodiments as generally described and illustrated in the figures herein could be arranged and designed in a wide variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

The phrases "connected to" and "coupled to" are used in their ordinary sense, and are broad enough to refer to any suitable coupling or other form of interaction between two or more entities, including mechanical and fluid interaction. Two components may be coupled to each other even though they are not in direct contact with each other. The phrases "attached to" or "attached directly to" refer to interaction between two or more entities which are in direct contact with each other and/or are separated from each other only by a fastener of any suitable variety (e.g., mounting hardware or an adhesive). The phrase "fluid communication" is used in its ordinary sense, and is broad enough to refer to arrangements in which a fluid (e.g., a gas or a liquid) can flow from one element to another element when the elements are in fluid communication with each other.

Inflatable airbag systems are widely used to reduce or minimize vehicle occupant injury during collision events. Airbag modules have been installed at various locations within a vehicle, including, but not limited to, within the steering wheel, within the dashboard and/or instrument panel, within the side doors or side seats, adjacent to a roof rail of the vehicle, in an overhead position, or at the knee or leg position. In the following disclosure, "airbag" generally refers to an inflatable front airbag, such as, for example, a passenger airbag that is typically housed within an instrument panel, although the principles discussed may apply to other types of airbags (e.g., driver airbags, knee airbags, and side airbags).

Front airbags are often installed in a dashboard or instrument panel of a vehicle. As used herein, the terms "dashboard" and "instrument panel" refer to a protruding region of a vehicle faced by a motor vehicle occupant, which often includes a glove compartment in a portion thereof that faces a passenger and may include instruments (e.g., radio and/or climate controls) in a more central region thereof, although such instruments need not be present. During installation, the airbags are typically at an interior of a housing in a packaged state (e.g., are rolled, folded, and/or otherwise compressed) and may be retained in the packaged state behind a cover. During a collision event, an inflator is triggered, which rapidly fills the airbag with inflation gas. The airbag can rapidly transition from the packaged state to an expanded or deployed state. For example, the expanding airbag can open an airbag cover (e.g., by tearing through a burst seam or opening a door-like structure) to exit the housing. The inflator may be triggered by any suitable device or system, and the triggering may be in response to and/or influenced by one or more vehicle sensors.

Certain embodiments of airbag assemblies that are disclosed herein are particularly well suited for use as passenger airbags, and may be mounted in a dashboard. In some embodiments, an airbag assembly includes two or more airbags that are configured to cushion an occupant during a collision event. A first or primary airbag can be configured to deploy primarily toward a vehicle occupant position (e.g., the position typically occupied by a passenger). This primary airbag may be configured to receive the torso and/or the head of a passenger in a frontal collision event. A second or supplemental airbag may be configured to deploy in a similar direction or in a different direction, such as, for example, in an inboard direction. For example, the supplemental airbag may be configured to deploy in a direction that is substantially parallel, oblique, lateral, transverse, or perpendicular to the direction in which the first airbag is deployed. The supplemental airbag may be particularly suited for cushioning the vehicle occupant (e.g., the head of the vehicle occupant) when the occupant moves in an oblique direction relative to a direction of travel of the vehicle.

Airbag assemblies that comprise multiple airbags may provide increased protection to a passenger, as compared with certain airbag assemblies that have only a single airbag. For example, in some embodiments, the first (e.g., primary) airbag may be configured to receive a vehicle occupant in a frontal collision event that causes the vehicle occupant to move primarily directly forward, as previously stated, and/or primarily in a direction of travel. The second (e.g., supplemental) airbag may be configured to stabilize the first airbag relative to the dashboard and/or receive the passenger when the vehicle is involved in a collision that causes the vehicle occupant to move in both a forward direction and an inboard direction (e.g., oblique to the direction of travel). For example, in some instances a single airbag may be too narrow to provide effective coverage for a vehicle occupant who has a forward and inboard trajectory (which may also be referred to as an angled or oblique trajectory). In some instances, a vehicle occupant may slide off of the single airbag during loading of the airbag when the occupant has a forward and inboard trajectory, or the occupant may entirely fail to engage with the single airbag.

An occupant's inboard (e.g., lateral) trajectory may arise from frontal-impact collisions where the impact is not distributed uniformly across the front plane of the vehicle. Such collisions may be, for example, oblique vehicle-to-vehicle collisions, such as collisions in which, immediately prior to impact, the occupant's vehicle is travelling in a direction that is not substantially parallel to the other vehicle's direction of travel; co-linear vehicle-to-vehicle collisions, such as collisions where, immediately prior to impact, both vehicles are travelling in substantially parallel directions; or collisions with a stationary object.

Some embodiments disclosed herein can provide improved positioning, cushioning, and/or safety to vehicle occupants involved in particular types of collisions. For example, some embodiments can be particularly suited to cushion front-seat passengers seated adjacent the passenger-side door. Examples of types of collisions in which certain embodiments may prove advantageous include one or more of (1) collisions where the struck object fails to engage the structural longitudinal components and/or engine block of the occupant's vehicle, (2) collisions where the impact forces act primarily outside of either the left or right longitudinal beams of the occupant's vehicle, (3) collisions classified under the Collision Deformation Classification scheme as FLEE or FREE, (4) front-impact collisions where the occupant's vehicle strikes no more than 25% of the vehicle width, (5) collisions as specified for the Insurance Institute for Highway Safety (IIHS) small overlap frontal crash test, or (6) collisions as specified for the National Highway Traffic Safety Administration (NHTSA) left oblique impact test. The conditions for the IIHS small overlap front crash test and the NHTSA oblique impact test are disclosed in the Insurance Institute for Highway Safety, *Small Overlap Frontal Crashworthiness Evaluation Crash Test Protocol (Version II)* (December 2012) and Saunders, J., Craig, M., and Parent, D., *Moving Deformable Barrier Test Procedure for Evaluating Small Overlap/Oblique Crashes*, SAE Int. J. Commer. Veh. 5(1):172-195 (2012).

In some embodiments, the second airbag is configured to inflate prior to inflation of the first airbag. For example, during a deployment event, a second inflator may fill the second airbag with inflation gas until the pressure within the airbag signals a first inflator to fill the first airbag with inflation gas. In some embodiments, the second airbag may deploy or begin deployment before the first airbag begins to be deployed. The first airbag and the second airbag can also be configured to receive inflation gas via a dual-stage inflator. Advantages of various embodiments will be evident from the present disclosure.

FIG. 1 is a side elevation view of an instrument panel 70 and an airbag assembly 100 within a vehicle 50. The instrument panel 70 may also be referred to herein as a dashboard. In many vehicles 50, a central region of the instrument panel 70 can include a stack of various buttons, controls, and other user interfaces. For example, the central region, which may commonly be referred to as a center stack or as an IP stack 71 (see FIG. 2), can include one or more of a screen (such as for navigation, backup camera display, etc.), radio and/or other media controls, climate controls, etc. The airbag assembly 100 is depicted in a deployed and inflated configuration. A vehicle occupant 60 is shown seated in a front passenger seat 54 of the vehicle 50. When the airbag assembly 100 is not deployed, the airbag assembly 100 may be positioned within the instrument panel 70 in a packaged state. As shown in FIG. 1, an occupant restraint system can comprise the airbag assembly 100 and any other suitable restraint devices, such as a seatbelt 56.

The airbag assembly 100 can include a first inflatable airbag cushion 110 (which may also be referred to as a primary airbag or a first airbag), a second inflatable airbag cushion 120 (which may also be referred to as a supplemental airbag or a second airbag), an inflator assembly 102, and an airbag housing 104. In some embodiments, the inflator assembly 102 may comprise a dual-stage inflator, wherein a first stage of the dual-stage inflator is coupled to or in fluid communication with the first airbag 110, and a second stage of the dual-stage inflator is coupled to or in fluid communication with the second airbag 120. In some other embodiments, the inflator assembly 102 may comprise a first inflator and a second inflator, wherein the first inflator is coupled to or in fluid communication with the first airbag 110, and the second inflator is coupled to or in fluid communication with the second airbag 120. Additionally, the first inflator and/or the second inflator may each comprise a single-stage inflator and/or a dual-stage inflator. Other configurations of the inflator assembly 102 are also contemplated. For example, the inflator assembly 102 may comprise three or more inflators.

The airbag housing 104 may be of any suitable variety, and may include a cover (not shown), behind which the first airbag 110 and the second airbag 120 are located when the first airbag 110 and the second airbag 120 are in a packaged state or a storage state. The cover may be of any suitable variety, and may include a tear seam or burst seam through which the first airbag 110 and the second airbag 120 may deploy. The housing 104 can be mounted within the dashboard 70 in any suitable manner.

The first airbag 110 and the second airbag 120 may be manufactured in any suitable manner, such as via one-piece weaving, "cut and sew" techniques, or a combination thereof. In some embodiments, separate panels may be joined together using sealed or unsealed seams, wherein the seams are formed by stitching, adhesive, taping, radio frequency welding, heat sealing, and/or any other suitable technique or combination of techniques.

In the illustrated embodiment, the first airbag 110 includes a first inflatable chamber 112 and the second airbag 120 includes a second inflatable chamber 122. Each of the first airbag 110 and the second airbag 120 can comprise any suitable shape. For example, in some embodiments, the first airbag 110 comprises any suitable passenger airbag configuration. In some embodiments, the first airbag 110 is formed of any suitable arrangement of panels. The panels may comprise separate pieces of material that are joined along seams or may be formed of a unitary piece of material. For example, the first airbag 110 may include one or more side panels adjacent to a side door of the vehicle 50, one or more oppositely positioned side panels facing the interior of the vehicle 50, and one or more panels that connect the side panels to each other to at least substantially enclose and/or define the first inflatable chamber 112. In the illustrated embodiment, the first airbag 110 comprises one or more front panels disposed at a front portion of the first airbag 110 (i.e., toward a front end of the vehicle 50) that form a front face 116 of the first airbag 110. As depicted, the first airbag 110 also comprises one or more rear panels disposed at a rear portion of the first airbag 110 (i.e., toward a rear end of the vehicle 50) that form a rear face 118 of the first airbag 110.

The second airbag 120 can also comprise any suitable shape and configuration, and may be formed in any suitable manner. For example, the second airbag 120 may likewise comprise a plurality of panels that are joined together along their edges to at least substantially enclose and/or define the second inflatable chamber 122. The panels may be formed of separate pieces of material or from a single piece of material. As discussed above in reference to the first airbag 110, the second airbag 120, as illustrated, also comprises one or more front panels disposed at a front portion of the second airbag 120 that form a front face 126 of the second airbag 120. As depicted, the second airbag 120 also comprises one or more rear panels disposed at a rear portion of the second airbag 120 that form a rear face 128 of the second airbag 120.

In some embodiments, the second airbag 120 can define a smaller volume than the first airbag 110. In some other embodiments, the second airbag 120 can define a similar volume to the first airbag 110. In yet other embodiments, the second airbag 120 can define a larger volume than the first airbag 110.

In other embodiments, the first airbag 110 may be sized and/or shaped differently. For example, the first airbag 110 may extend further toward the occupant 60 than the embodiment shown in FIG. 1. The first airbag 110 may even possibly extend toward the occupant 60 to a similar or greater measure than the second airbag 120 (see e.g., FIGS. 7A-7D, discussed below). The first airbag 110 may extend higher, possibly even higher than the second airbag 120. The first airbag 110 may extend lower, possibly even lower than the second airbag 120. The first airbag 110 may extend further forward toward a front of the vehicle 50, possibly even more forward than the second airbag 120, for example, to conform to the dashboard 70 of the vehicle 50.

When the first airbag 110 is fully deployed, the first airbag 110 can be positioned directly in front of the occupant 60. When the second airbag 120 is fully deployed, at least a portion of the second airbag 120 can extend laterally, in an inboard direction, from the first airbag 110, and at least a portion of the second airbag 120 can extend substantially parallel with the first airbag 110 to a position adjacent the occupant 60. The second airbag 120, when deployed, may cover a portion of the vehicle 50 and/or dashboard 70 spaced from and adjacent to a portion of the vehicle 50 and/or dashboard 70 covered by the first airbag, when deployed. For example, in some embodiments, at least a portion of the second airbag 120 may be configured to cover at least a portion of the IP stack region 71 (see FIGS. 3A and 3B) of the dashboard 70. In certain embodiments, the first airbag 110 may be coupled to the second airbag 120 in any suitable manner, such as via one or more tethers, membranes, nets, panels, and/or stitching (see, e.g., FIG. 8 discussed below). In some embodiments, the first airbag 110 and the second airbag 120 may be coupled via an inflatable membrane, wherein the inflatable membrane is in fluid communication with the first airbag 110 and/or the second airbag 120. Such arrangements may increase lateral coverage of the deployed airbag assembly 100 without increasing, or substantially increasing, a volume of the first inflatable chamber 112 and/or the second inflatable chamber 122.

In the illustrated embodiment, the first airbag 110 defines the first inflatable chamber 112 that is configured to receive inflation gas from the inflator assembly 102. The first airbag 110 can thereby inflate and expand from a packaged state (or a storage state) to a deployed state (or an expanded state). Likewise, the second airbag 120 defines the second inflatable chamber 122 that is also configured to receive inflation gas from the inflator assembly 102. The second airbag 120 can thereby inflate and expand from a packaged state (or a storage state) to a deployed state (or an expanded state).

The airbag assembly 100 illustrated in FIG. 1 is deployed to receive the vehicle occupant 60. The occupant 60 is shown seated in the seat 54 configured to accommodate a single person (e.g., a bucket seat). The seat 54 may provide a well-defined vehicle occupant region 57, which may also be referred to herein as a vehicle occupant position, within which the vehicle occupant 60 is generally positioned while in the seat 54. As previously mentioned, the first airbag 110 can be configured to deploy directly in front of the vehicle occupant region 57 and/or toward the vehicle occupant region 57. Stated otherwise, in some instances, the deployment of the first airbag 110 may follow a trajectory that is not in a straight line toward the vehicle occupant region 57, such as by expanding upwardly toward a windshield 52 of the vehicle 50 and/or downwardly toward a floor of the vehicle 50. However, a general deployment of the first airbag 110 may nevertheless be generally rearward toward the vehicle occupant region 57.

In operation, the airbag assembly 100 can be deployed when the vehicle 50 is involved in a collision. As discussed in greater detail below, the first airbag 110 can be configured to deploy prior to deployment of the second airbag 120, and vice versa. The first airbag 110 can deploy in a direction toward the vehicle occupant 60 in any suitable manner. For example, the first airbag 110 can deploy generally as a typical passenger airbag might deploy. In the illustrated embodiment, the second airbag 120 receives inflation gas from the inflator assembly 102 to inflate, expand, and extend from the airbag housing 104.

In some instances, when the vehicle 50 is involved in a collision that causes the occupant 60 to move primarily or substantially exclusively in a forward direction toward the dashboard 70, the first airbag 110 may receive the vehicle occupant 60 in a typical fashion. The forward direction is depicted by the arrow 40. The forward direction 40 may be a forward direction of travel of the vehicle 50. In other instances, the vehicle 50 can be involved in a collision that causes the occupant 60 to move in both the forward direction 40 and an inboard direction (e.g., toward the center of the vehicle 50 or toward the driver side of the vehicle 50, in an oblique direction relative to the forward direction 40). The second airbag 120 can provide an additional cushioning region for the occupant 60 in such instances. For example, in some circumstances, the occupant 60 may miss the first airbag 110 but may be received by the second airbag 120. In other or further circumstances, the first airbag 110 may roll as the occupant 60 engages an inboard corner thereof such that the occupant 60 does not fully engage the first airbag 110 and may then be received by the second airbag 120. In still other or further circumstances, the second airbag 120 may stabilize the first airbag 110 to make the first airbag 110 resistant to rolling or otherwise missing the occupant 60 as the occupant 60 travels in an angled (oblique) forward/inboard direction.

FIG. 2 is a top plan view of an airbag assembly 200 that can resemble the airbag assembly 100 described above in certain respects. Accordingly, like features are designated with like reference numerals, with the leading digits incremented to "2." Relevant disclosure set forth above regarding similarly identified features thus may not be repeated hereafter. Moreover, specific features of the airbag assembly 200 may not be shown or identified by a reference numeral in the drawings or specifically discussed in the written description that follows. However, such features may be the same, or substantially the same, as features depicted in other embodiments and/or described with respect to such embodiments. Accordingly, the relevant descriptions of such features apply equally to the features of the airbag assembly 100. Any suitable combination of the features and variations of the same described with respect to the airbag assembly 100 can be employed with the airbag assembly 200, and vice versa. This pattern of disclosure applies equally to further embodiments depicted in subsequent figures and described hereafter, wherein the leading digits may be further incremented.

In the illustrated embodiment, the airbag assembly 200 comprises a first airbag 210, a second airbag 220, a first inflator 214, and a second inflator 224 disposed in an airbag housing 204.

Referring again to FIG. 2, the first inflator 214 may be coupled to or in fluid communication with the first airbag 210 such that the first airbag 210 is configured to receive inflation gas from the first inflator 214 and deploy from the airbag housing 204. Likewise, the second inflator 224 may be coupled to or in fluid communication with the second airbag 220 such that the second airbag 220 is configured to receive inflation gas from the second inflator 224 and deploy from the airbag housing 204. As illustrated, the first airbag 210 and the second airbag 220 are independent airbags, wherein each of the first airbag and the second airbag 210, 220 is coupled to an independent inflator 214, 224; however, each of the independent airbags 210, 220 and the independent inflators 214, 224 are attached to, coupled to, or disposed in a single airbag housing 204 and may be covered by a single cover (not shown).

As depicted in FIG. 2, the first airbag 210 and the second airbag 220, when in a packaged state or storage state, are disposed in the airbag housing 204 adjacent, or substantially adjacent, to each other. In some embodiments, the first airbag 210 and the second airbag 220 may be deployed or inflated with no fluid communication between the first airbag 210 and the second airbag 220. As such, expansion, deployment, and/or inflation of the first airbag 210 may be independent of expansion, deployment, and/or inflation of the second airbag 220, and vice versa. In some embodiments, the airbag assembly 200 may comprise one inflator or more than two inflators. For example, the airbag assembly 200 may comprise an inflator assembly disposed within the airbag housing 204, wherein the inflator assembly comprises a single dual-stage inflator. The dual-stage inflator may be coupled to or in fluid communication with each of the first airbag 210 and the second airbag 220, such that each of the first airbag 210 and the second airbag 220 is configured to receive inflation gas from the dual-stage inflator and deploy from the airbag housing 204. The first airbag 210 may receive inflation gas from a first stage of the dual-stage inflator, and the second airbag 220 may receive inflation gas from a second stage of the dual-stage inflator. In some embodiments, the dual-stage inflator may be coupled to a device (e.g., a T-shaped gas guide) that directs or splits the inflation gas expelled from the dual-stage inflator into each of the first airbag 210 and the second airbag 220. In certain embodiments, the first stage and the second stage of the dual-stage inflator may expel inflation gas from separate and distinct orifices. Use of a single dual-stage inflator in contrast to two single-stage inflators may decrease the volume occupied by the inflator assembly in the airbag housing 204 and/or may simplify the assembly or manufacture of the airbag assembly 200.

The first airbag 210 and the second airbag 220 of the airbag assembly 200 may each have a smaller volume than an airbag of an airbag assembly comprising a single airbag. As such, the inflator output level of each of the first inflator 214 and/or the second inflator 224 may be less than the output level of an inflator disposed in an airbag assembly comprising a single airbag. Further, some airbag assemblies having a single airbag may comprise a dual-stage inflator. The inflator output level of each of the first inflator 214 and/or the second inflator 224 may be less than the output level of a dual-stage inflator disposed in an airbag assembly comprising a single airbag. The airbag assembly 200 of the present disclosure may comprise one or more single-stage inflators, which may be smaller or occupy less volume than a dual-stage inflator. As such, the airbag assembly 200 may be more compact or smaller than certain other airbag assemblies having a single airbag.

As depicted in FIG. 2, the airbag housing 204 is disposed in the dashboard 70 lateral to and outboard in relation to the IP stack 71. In some embodiments, the airbag housing 204 may be disposed in another suitable location and/or the vehicle may not comprise an IP stack 71. In some embodiments, the relative positions of the instrument panel 70, the IP stack 71, and/or the airbag housing 204 may vary from the positions illustrated in FIG. 2. For example, some vehicles may comprise a different arrangement, or relative positioning, of the instrument panel 70, the IP stack 71, and/or the airbag housing 204. Additionally, some vehicles may not comprise the instrument panel 70 and/or IP stack 71 as disclosed herein. Thus, other configurations of the instrument panel 70, the IP stack 71, and the airbag housing 204 are also contemplated.

Figure 3A:
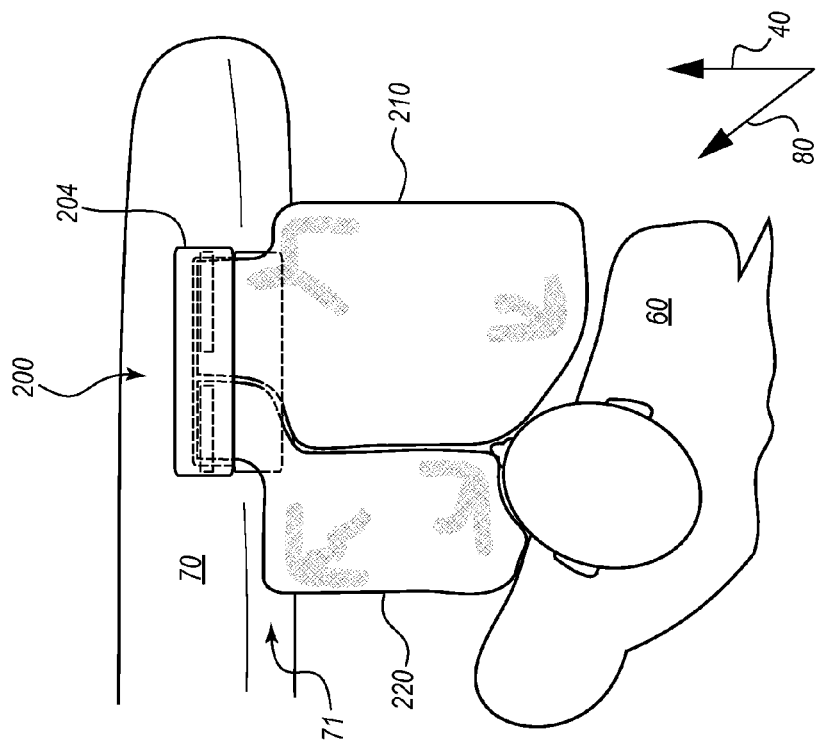
FIG. 3A is a top plan view of the airbag assembly of FIG. 2 deployed in a collision event, in which the vehicle occupant is depicted moving toward the deployed airbag assembly in an oblique direction relative to the direction of travel of the vehicle.

FIG. 3A depicts the airbag assembly 200 in a deployed state due to a collision event that causes the torso of the occupant 60 to travel in an angled forward/inboard direction such as that described above. The angled direction, which may also be referred to as an oblique direction, is depicted by the arrow 80. In the illustrated embodiment, the first airbag 210 deploys from the instrument panel 70 in a first direction toward the occupant 60 seated in front of the airbag housing 204. In this manner, the first airbag 210 is prepared to receive the occupant 60, and would do so in a typical fashion if the vehicle occupant 60 were to move primarily in the forward direction 40 (i.e., toward the front of the vehicle 50), such as depicted in FIG. 1. However, the angled movement of the occupant 60 may inhibit the occupant 60 from adequately engaging with the first airbag 210.

As shown in FIG. 3A, the deployed second airbag 220 extends laterally along the instrument panel 70 toward the driver's side of the vehicle and rearward toward at least a portion of the vehicle occupant position. A front face 226 of the second airbag 220 can be positioned adjacent to the dashboard 70, and a rear face 228 of the second airbag 220 can be positioned at or adjacent at least a portion of the vehicle occupant position when the second airbag 220 is inflated. Such an orientation of the second airbag 220 can assist in stabilizing the first airbag 210. In other or further arrangements, such an orientation can permit the second airbag 220 to readily receive the occupant 60 if the occupant 60 bypasses or is not fully stopped by the first airbag 210. The second airbag 220 may thus shield the occupant 60 from harmful contact with the dashboard 70, and in some instances, may be oriented in such a manner to shield the occupant 60 from harmful contact with the IP stack region 71 of the dashboard 70.

In the illustrated embodiment, the IP stack region 71 is illustrated as being substantially flush with adjacent outboard portions of the dashboard 70. Similarly, the front face 226 of the second airbag 220 may be substantially flush with the IP stack region 71 of the dashboard 70. In other embodiments, the IP stack region 71 may project rearward within the cabin of the vehicle. In certain of such embodiments, the front face 226 of the second airbag 220 may be positioned rearward (i.e., toward a rearward end of the vehicle) relative to a front face 216 of the first airbag 210.

The deployed second airbag 220 can receive, or be configured to receive, the vehicle occupant 60 if the occupant 60 misses the first airbag 210. In other or further circumstances, the first airbag 210 may roll as the occupant 60 engages an inboard rear corner thereof, or similar edge portion of the first airbag 210, such that the occupant 60 does not fully engage the first airbag 210 and may then be received by the second airbag 220. In still other or further circumstances, the second airbag 220 may stabilize the first airbag 210 to make the first airbag 210 resistant to rolling or otherwise missing the occupant 60 as the occupant 60 travels in an angled forward/inboard direction 80.

Figure 3B:
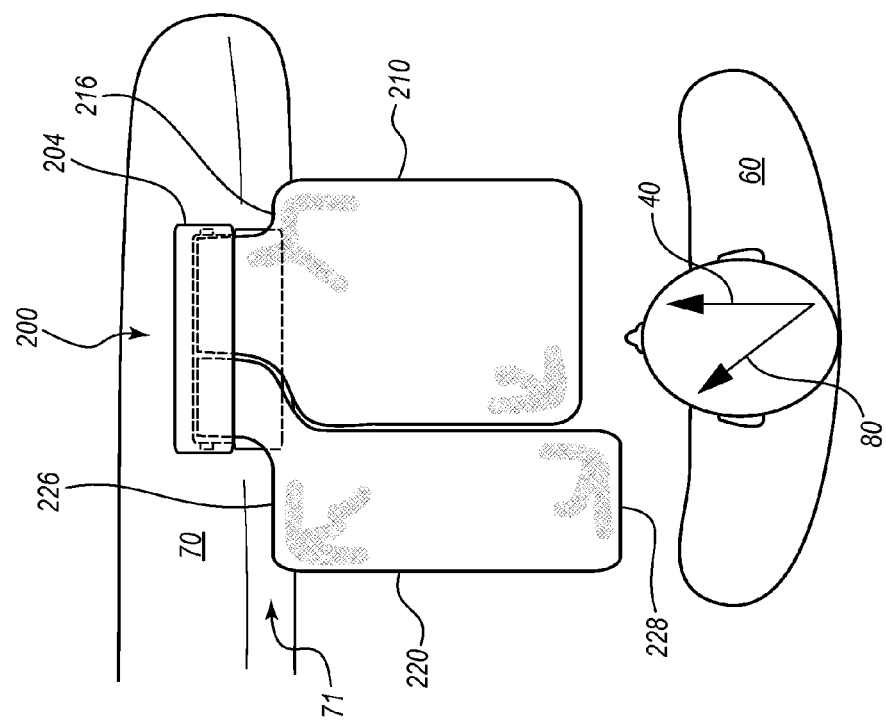
FIG. 3B is a top plan view of the airbag assembly of FIG. 2 that depicts a subsequent position of the vehicle occupant, as compared to FIG. 3A, in which the first airbag and the second airbag are cushioning the vehicle occupant.

FIG. 3B depicts the vehicle occupant 60 at a later stage of travel in the angled forward/inboard direction 80 at interaction with the deployed airbag assembly 200. In the illustrated embodiment, the torso of the occupant 60 has only partially engaged with the first airbag 210, while another portion of the torso has either deflected off of or bypassed the first airbag 210 to engage the second airbag 220, due to the movement of the occupant 60 in the oblique direction 80 (i.e., oblique relative to the forward direction 40). The head of the occupant 60 is also shown being at least partially received by the second airbag 220. In some instances, when the occupant 60 contacts an inboard region of the first airbag 210, it may cause the head of the occupant 60 to rotate in an outboard direction (i.e., toward the passenger door). The second airbag 220 may reduce or prevent such rotational movement, which might otherwise result in or contribute to kinematic rotational brain injury. In some instances, an effectiveness of the airbag assembly 200 at reducing such brain injury can be sensitive to a position at which the head of the occupant 60 originally contacts the first airbag 210. The configuration of the second airbag 220 may be determined in view of this relationship, in some instances.

In some collision scenarios, the shoulder restraint portion of the seatbelt 56 (see FIG. 1) may slip off of the shoulder (e.g., the right shoulder) of the occupant 60 due to the oblique movement of the occupant 60. With little or no restraint provided by the seatbelt 56 to inhibit movement of the torso of the occupant 60 along an oblique trajectory, it may be particularly desirable for the second airbag 220 to be configured to cushion the occupant 60, or the portion thereof, that bypasses the first airbag 210 to prevent hard contact of the occupant 60 with the instrument panel 70.

In the illustrated embodiment, the head and left shoulder of the occupant 60 are protected from harmful contact with the dashboard 70 by the second airbag 220. In other instances, the second airbag 220 may protect other body portions of the occupant 60 due to the nature of the collision; the size, shape, and/or initial position of the occupant 60; the configuration of the second airbag 220; etc. In some embodiments, the second airbag 220 is configured to primarily cushion the head of the vehicle occupant 60.

In some embodiments, it may be desirable for the head of the occupant 60 to "pocket" between the first airbag 210 and the second airbag 220. For example, in the illustrated embodiment, the head is shown within a depression or gap positioned between each of the first airbag 210 and the second airbag 220, which may also be referred to as a pocket. Such an arrangement may stabilize the head during ridedown and/or may reduce rotational velocities of the head. Such a reduction in rotational velocities of the head may advantageously reduce the risk of brain injury.

In some instances, differently sized occupants may interact with the airbag assembly 200 differently when the vehicle undergoes identical, or substantially identical, collision events. For example, in some instances, an occupant 60 who is larger than the occupant 60 depicted in FIGS. 2-3B may be received almost exclusively via the first airbag 210. For example, the head and torso of the larger occupant 60 may be received by the first airbag 210. In such circumstances, the second airbag 220 may nevertheless assist in stabilizing the first airbag 210 and in preventing the occupant 60 from slipping off of the first airbag 210 or missing the first airbag 210 due to bouncing or other instability of the first airbag 210. In certain embodiments, an internal air pressure of the second airbag 220 in an expanded or deployed state may be higher than an internal air pressure of the first airbag 210 in an expanded state or a deployed state. Such a configuration of the second airbag 220 may at least partially control or direct a direction of deployment of the first airbag 210 and/or provide restraint or support for the first airbag 210.

The airbag assembly shown in FIGS. 3A and 3B, like other embodiments disclosed herein, may protect an occupant 60 (and, in particular, the occupant's head) from contact with hard surfaces, including, for example, the instrument panel 70 (including the center stack 71 of an instrument panel 70). In other embodiments, the second airbag 220 may be disposed at other positions in relation to the first airbag 210 to prevent contact with other portions of the vehicle. For example, in other or further embodiments, the second airbag 220 may be positioned at an outboard side of the first airbag 210. Such a location of the second airbag 220 may assist in preventing harmful contact with the windshield, an A-pillar, and/or portions of a door of the vehicle, such as when the vehicle occupant 60 is moved in an oblique direction that is both in a forward direction and an outboard direction. In other or further embodiments, one or more supplemental airbags 220 may be positioned to deploy below the primary airbag 210 to shield the knees of the occupant 60. In other or further embodiments, one or more supplemental airbags 220 may be positioned to deploy above the primary airbag 210. Any suitable number and/or combination of supplemental airbags 220 that extend from the housing 204 are contemplated.

Figure 4:
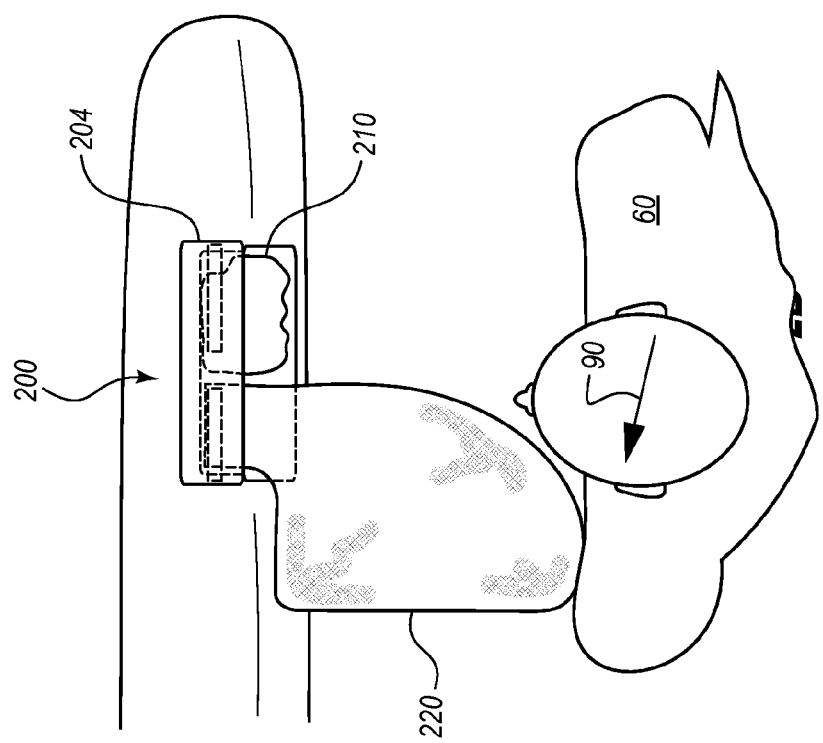
FIG. 4 is a top plan view of the airbag assembly of FIG. 2 deployed in a different collision event, in which the vehicle occupant has moved toward a deployed first airbag of the airbag assembly in the direction of travel of the vehicle, and in which the first airbag cushions the vehicle occupant.

FIG. 4 depicts the airbag assembly 200 in a deployed state due to a collision event that causes the torso of the occupant 60 to travel in a substantially forward direction. The forward direction, as discussed above, is depicted by the arrow 40. In some embodiments, the airbag assembly 200 may be configured (e.g., via one or more sensors) to calculate or detect the direction of travel of the vehicle, or various characteristics of the vehicle occupant 60 (e.g., the occupant's size), due to or during a collision event. For example, in the illustrated embodiment, the airbag assembly 200 may have calculated or detected the substantially forward movement of the occupant 60, and deployment of only the first airbag 210 may have been triggered by the airbag assembly 200. As depicted, upon substantially forward movement of the vehicle occupant 60, deployment of the first airbag 210 (and not the second airbag 220) may be preferred or sufficient to properly cushion and protect the vehicle occupant 60 during some collision events, such as the illustrated collision event.

Figure 5:
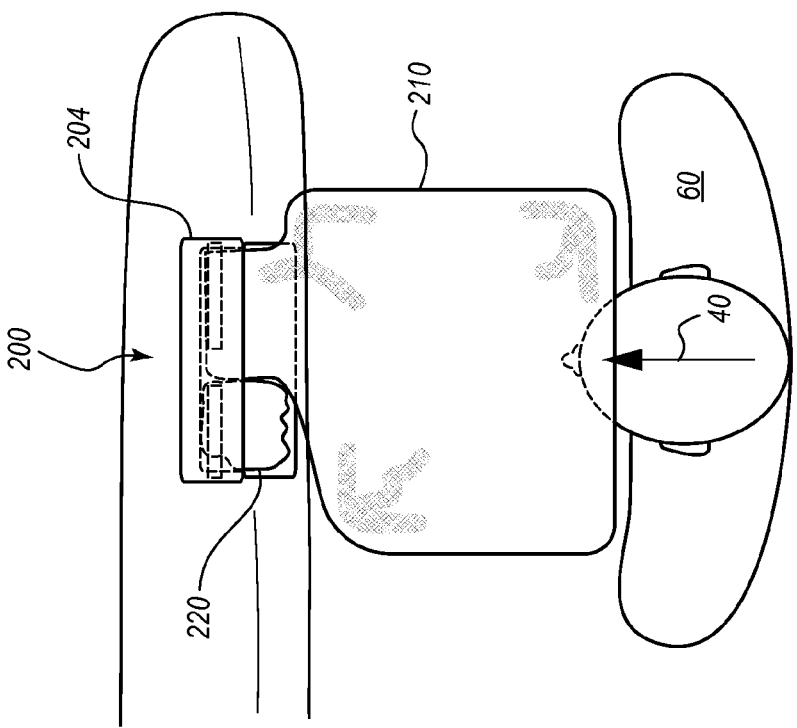
FIG. 5 is a top plan view of the airbag assembly of FIG. 2 deployed in a different collision event, in which the vehicle occupant has moved toward a deployed second airbag of the airbag assembly in a substantially lateral direction relative to the direction of travel of the vehicle, and in which the second airbag cushions the vehicle occupant.

FIG. 5 depicts the airbag assembly 200 in a deployed state due to a collision event that causes the torso of the occupant 60 to travel in a substantially lateral, inboard direction. The lateral, inboard direction is depicted by the arrow 90. As discussed above, in some embodiments, the airbag assembly 200 may be configured to calculate or detect the direction of travel of the vehicle, or various characteristics of the vehicle occupant 60 (e.g., the occupant's size), due to or during a collision event. For example, in the illustrated embodiment, the airbag assembly 200 may have calculated or detected the substantially lateral, inboard movement of the occupant 60, and deployment of only the second airbag 220 may have been triggered by the airbag assembly 200. As depicted, upon lateral, inboard movement of the vehicle occupant 60, deployment of the second airbag 220 (and not the first airbag 210) may be preferred and/or sufficient to properly cushion and protect the vehicle occupant 60 during some collision events, such as the illustrated collision event.

Figure 6B:
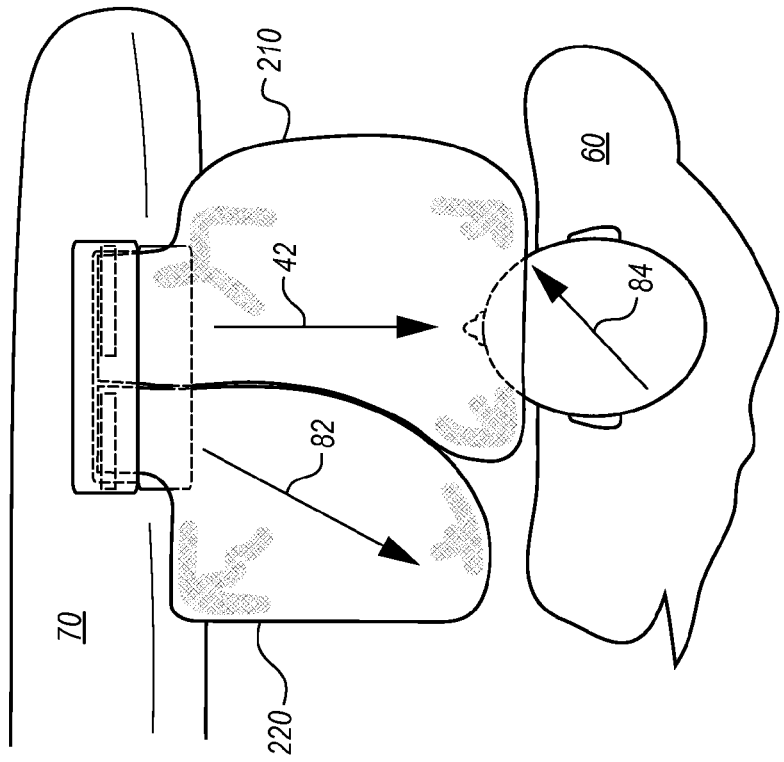
FIG. 6B is a top plan view of the airbag assembly of FIG. 2 that depicts a subsequent position of the vehicle occupant, as compared to FIG. 6A, in which the first airbag and second airbag cushion the occupant.
Figure 6A:
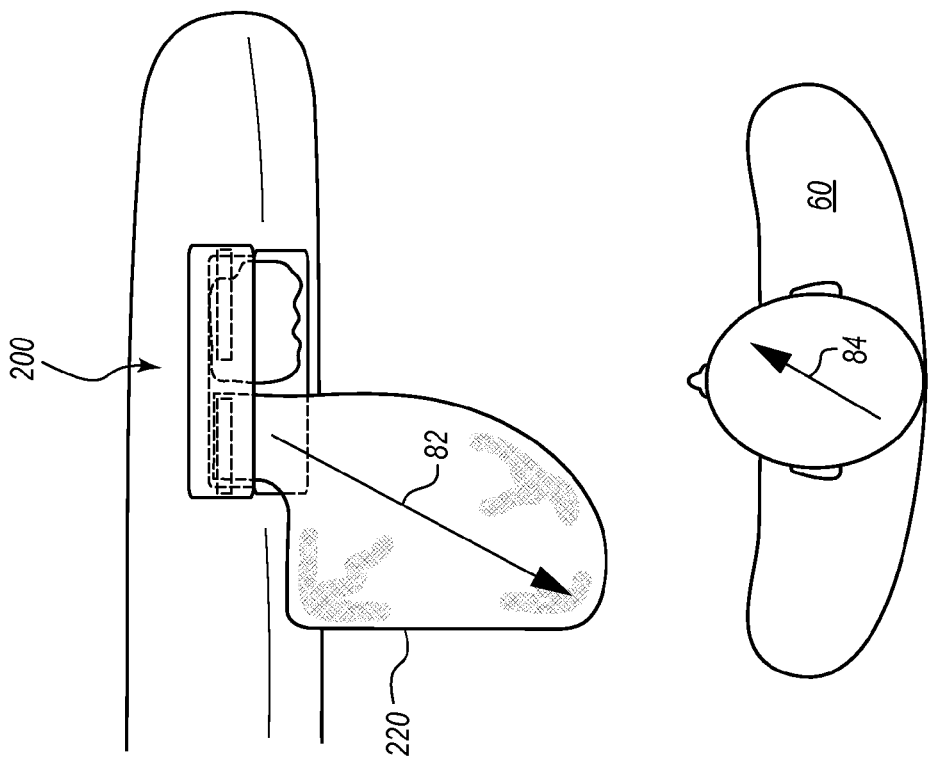
FIG. 6A is a top plan view of the airbag assembly of FIG. 2 deployed in a different collision event, in which the vehicle occupant is depicted moving toward the airbag assembly in an oblique outboard direction relative to the direction of travel of the vehicle.

As illustrated in FIG. 6A, the second airbag 220 of the airbag assembly 200 may deploy in a direction indicated by arrow 82 (e.g., substantially opposite to a direction of movement 84 of the occupant 60). FIG. 6B illustrates that subsequent to deployment of the second airbag 220, the first airbag 210 may then deploy in a direction indicated by arrow 42, for example, toward the occupant. The direction 82 may be obliquely inboard of the vehicle, for example, to cover a portion of the dashboard 70 laterally spaced closer to a center of the vehicle from a portion of the dashboard 70 that is covered by the first airbag 210. Deployment of the second airbag 220 prior to the deployment of the first airbag 210 may direct or force the subsequently deployed first airbag 210 to deploy at least partially laterally towards a passenger door of the vehicle during a collision event when the occupant 60 may travel in a laterally outboard direction toward the passenger door of the vehicle as indicated by the arrow 84. Other configurations are possible. In certain embodiments, the second airbag 220 may deploy in a second direction that may be downward (e.g., such as in a knee airbag). In other embodiments, the second airbag 220 may deploy in a second direction that may be laterally outboard, toward the outside of the vehicle.

FIGS. 7A-7D depict other embodiments of airbag assemblies 300, 400, 500, 600 that can resemble the airbag assemblies 100, 200 described above in certain respects. Accordingly, like features are designated with like reference numerals, with the leading digits incremented to "3," "4," "5," and "6." Relevant disclosure set forth above regarding similarly identified features thus may not be repeated hereafter. Moreover, specific features of the airbag assemblies 300, 400, 500, 600 may not be shown or identified by a reference numeral in the drawings or specifically discussed in the written description that follows. However, such features may be the same, or substantially the same, as features depicted in other embodiments and/or described with respect to such embodiments. Accordingly, the relevant descriptions of such features apply equally to the features of the airbag assemblies 100, 200. Any suitable combination of the features and variations of the same described with respect to the airbag assemblies 100, 200 can be employed with the airbag assemblies 300, 400, 500, 600, and vice versa. This pattern of disclosure applies equally to further embodiments depicted in subsequent figures and described hereafter, wherein the leading digits may be further incremented.

FIGS. 7A-7D depict side views of interior portions of various embodiments of airbag assemblies 300, 400, 500, 600, which may be similar to the airbag assemblies 100, 200 discussed above. Airbag cushion sizes and/or shapes can be designed, modified, or tuned to adjust restraint performance for various factors including, but not limited to, occupant size, seatbelt usage, and/or impact conditions (including zero degree full frontal impact, angular impact, offset impact, overlap/oblique impact, etc.). For example, the width of the first airbag cushion can be reduced relative to certain other airbag cushions, and the second airbag cushion can be sized to provide additional coverage for oblique loading conditions. Additionally, the depth and/or height of the second airbag cushion can be varied relative to the first airbag cushion. For example, additional or increased depth may provide additional support for oblique or lateral loading, such as in far side oblique impacts.

Figure 7A:
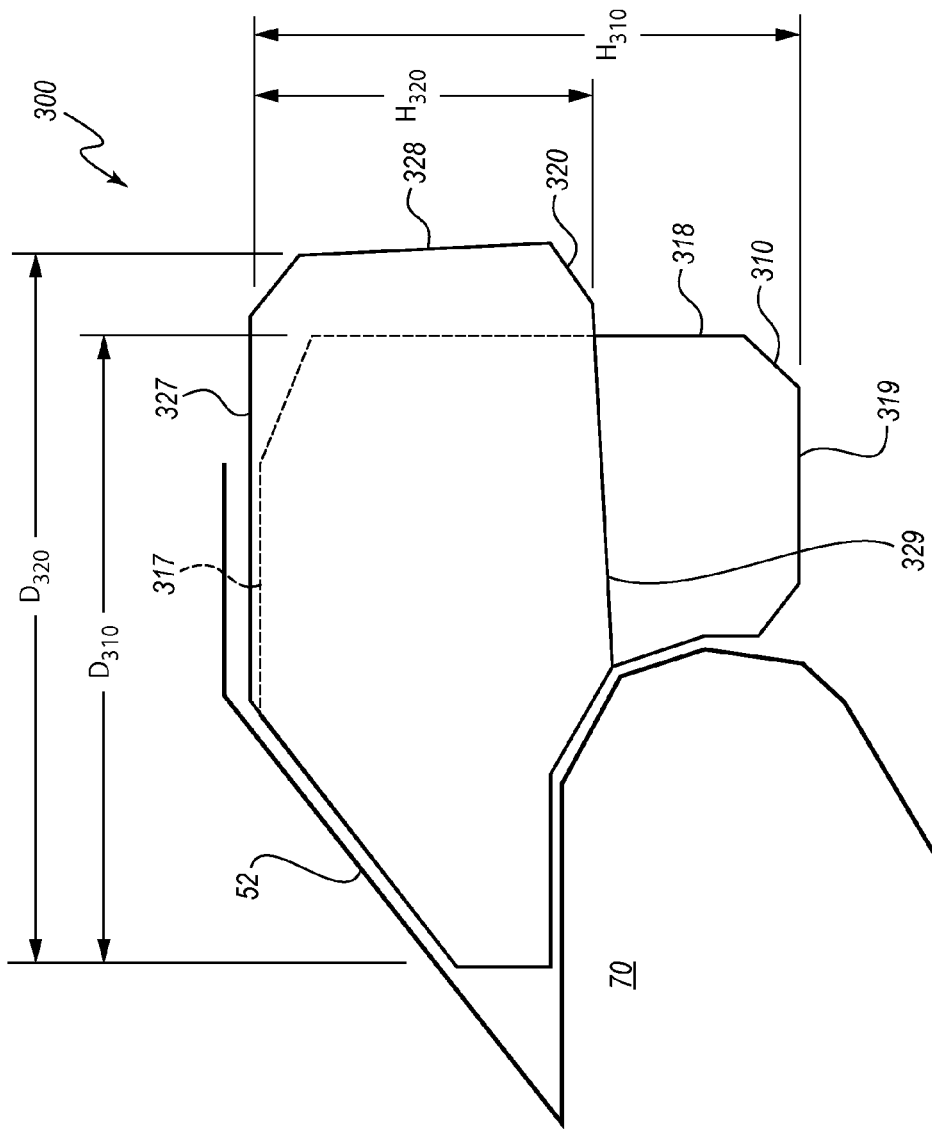
FIG. 7A is a side elevation view of an airbag assembly, according to another embodiment of the present disclosure, in a deployed state within a vehicle.

FIG. 7A depicts an embodiment of an airbag assembly 300 comprising a first airbag 310 and a second airbag 320 in a deployed state or an expanded state. The first airbag 310 and the second airbag 320 may deploy from an airbag housing (not shown) disposed at a position within the dashboard 70. As illustrated, the first airbag 310 has a depth $D_{310}$ and a height $H_{310}$. Likewise, the second airbag 320 has a depth $D_{320}$ and a height $H_{320}$. The depth as described herein defines or describes a maximum distance from a point of attachment of the first or second airbag 310, 320 within the airbag housing to a point along a rear face 318, 328 of the first or second airbag 310, 320, respectively, when the first or second airbag 310, 320 is in a deployed state or an expanded state. The height as described herein defines or describes a maximum distance from a point along an upper surface 317, 327 of the first or second airbag 310, 320 to a point along a lower surface 319, 329 of the first or second airbag 310, 320, respectively, when the first or second airbag 310, 320 is in a deployed state or an expanded state.

As depicted, the depth $D_{320}$ is greater than the depth $D_{310}$; however, the height $H_{320}$ is less than the height $H_{310}$. Thus, the second airbag 320 extends further toward a vehicle occupant than the first airbag 310, however, the first airbag 310 extends lower than the second airbag 320, thus covering a larger portion of the dashboard 70 than the second airbag 320. As depicted, the first airbag 310 and the second airbag 320 may be designed to conform to each of the dashboard 70, the windshield 52, and/or the ceiling of the vehicle. FIGS. 7A-7D depict various sizes and shapes of a first airbag and a second airbag that may be advantageous or desirable for use in different vehicles. Other shapes and sizes of first airbags and second airbags that are not specifically depicted in the figures are also possible and contemplated.

Figure 7B:
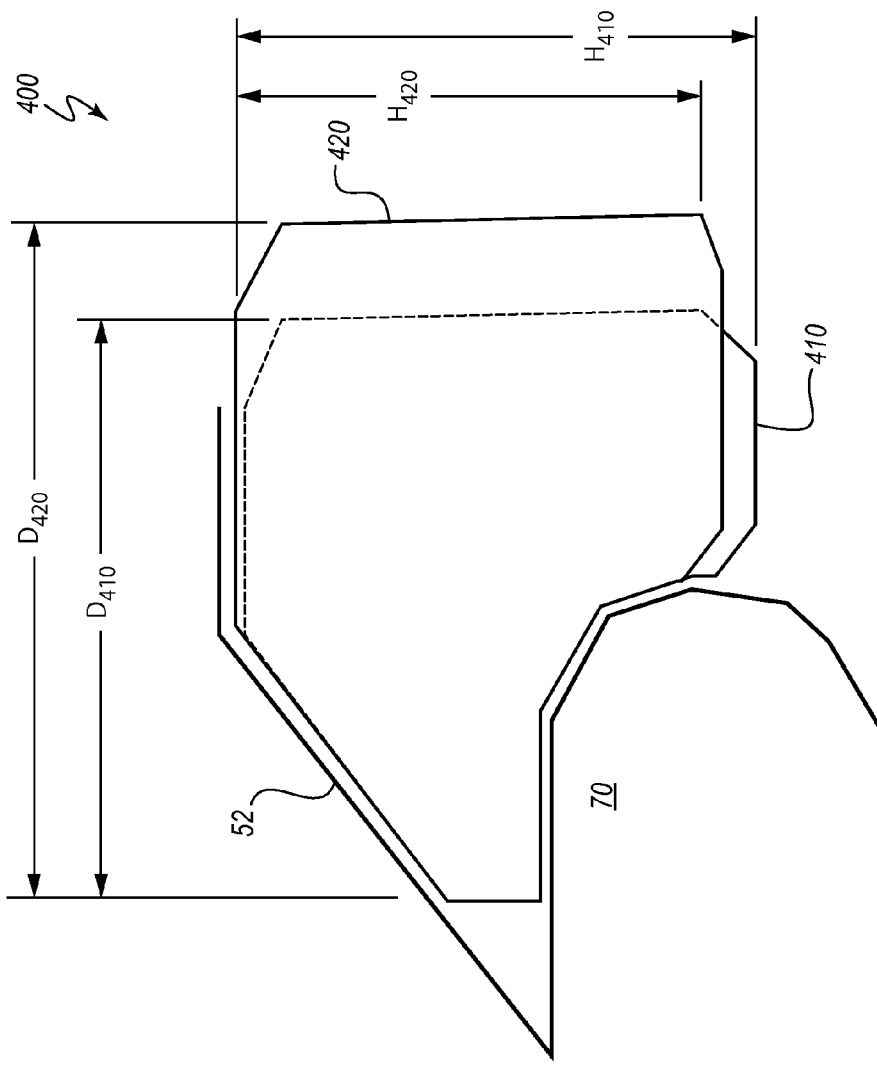
FIG. 7B is a side elevation view of an airbag assembly, according to another embodiment of the present disclosure, in a deployed state within a vehicle.

FIG. 7B depicts another embodiment of an airbag assembly 400 comprising a first airbag 410 and a second airbag 420 in a deployed state or an expanded state. As illustrated, the first airbag 410 has a depth $D_{410}$ and a height $H_{410}$. Likewise, the second airbag 420 has a depth $D_{420}$ and a height $H_{420}$. As in the embodiment of FIG. 7A, the depth $D_{420}$ is greater than the depth $D_{410}$, while the height $H_{420}$ is less than the height $H_{410}$. In contrast to the embodiment of FIG. 7A, however, the height $H_{420}$ is only slightly less than the height $H_{410}$, whereas in the embodiment of FIG. 7A, the height $H_{320}$ is substantially less than the height $H_{310}$. Such a configuration may be advantageous or desirable in various vehicles.

Figure 7C:
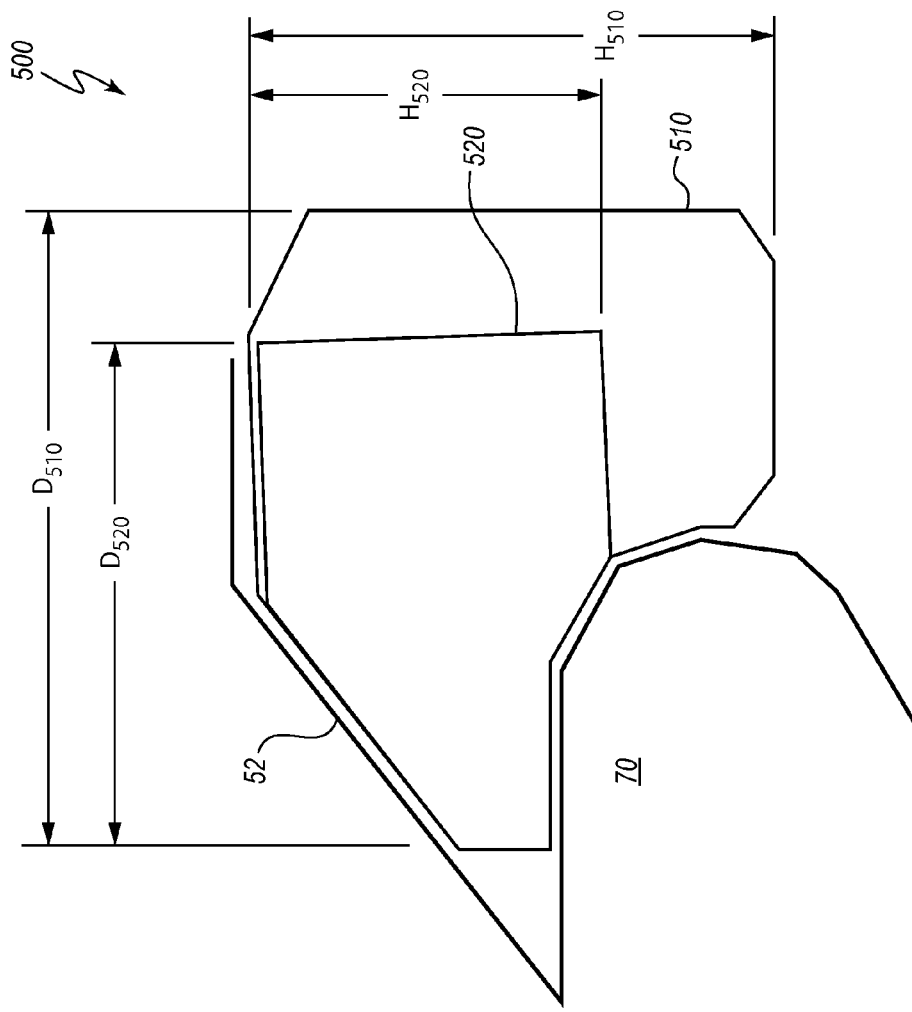
FIG. 7C is a side elevation view of an airbag assembly, according to another embodiment of the present disclosure, in a deployed state within a vehicle.

FIG. 7C depicts another embodiment of an airbag assembly 500 comprising a first airbag 510 and a second airbag 520, wherein the first airbag 510 and the second airbag 520 are in a deployed state or an expanded state. As illustrated, the first airbag 510 has a depth $D_{510}$ and a height $H_{510}$. Likewise, the second airbag 520 has a depth $D_{520}$ and a height $H_{520}$. In contrast to the embodiments of FIGS. 7A and 7B, however, both the depth $D_{510}$ and the height $H_{510}$ are greater than the depth $D_{520}$ and the height $H_{520}$, respectively.

Figure 7D:
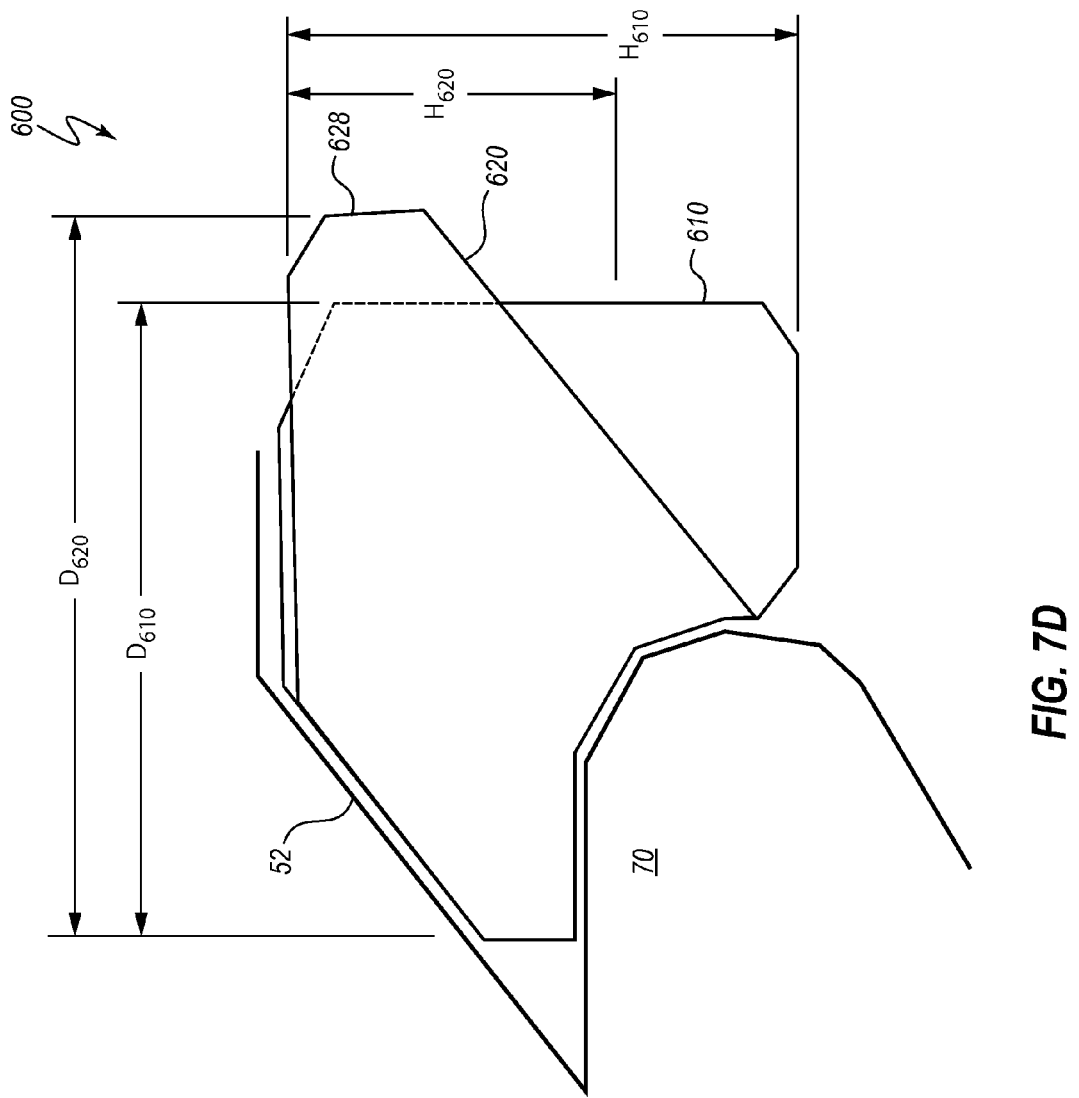
FIG. 7D is a side elevation view of an airbag assembly, according to another embodiment of the present disclosure, in a deployed state within a vehicle.

FIG. 7D depicts another embodiment of an airbag assembly 600 comprising a first airbag 610 and a second airbag 620, wherein the first airbag 610 and the second airbag 620 are in a deployed state or an expanded state. As illustrated, the first airbag 610 has a depth $D_{610}$ and a height $H_{610}$. Likewise, the second airbag 620 has a depth $D_{620}$ and a height $H_{620}$. The depth $D_{620}$ is greater than the depth $D_{610}$; however, the height $H_{610}$ is greater than the height $H_{620}$. Additionally, the second airbag 620 comprises a shape that differs from the second airbags 320, 420, 520 as depicted in FIGS. 7A-7C. For example, the depth $D_{620}$ of the second airbag 620 is greatest at or adjacent the midpoint of the second airbag 620, but the depth of the second airbag 620 is substantially less at or adjacent a rear face 628 of the second airbag 620. As discussed above, other configurations, sizes, and/or shapes of each of the first airbags and the second airbags are also contemplated.

Figure 8:
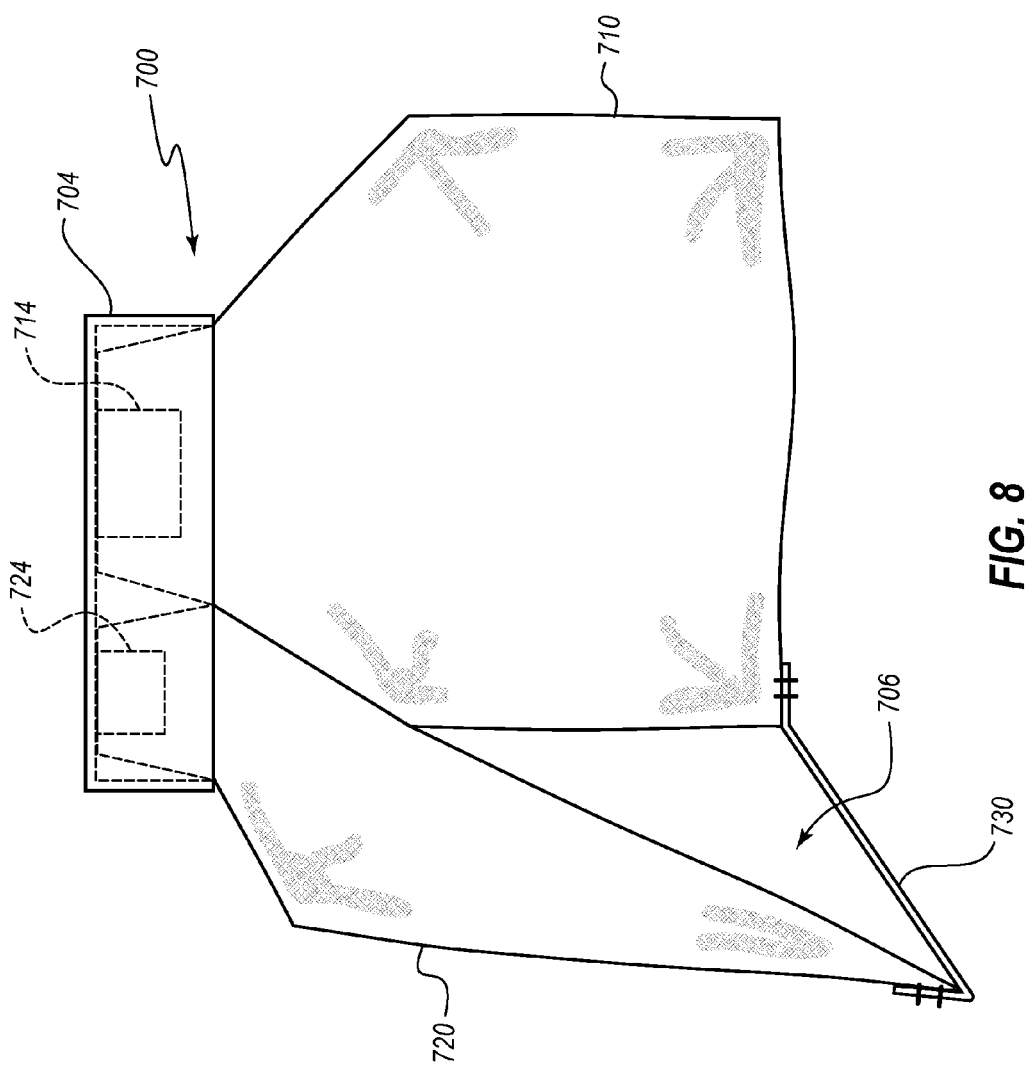
FIG. 8 is a top plan view of an airbag assembly, according to another embodiment of the present disclosure, in a deployed state.

FIG. 8 is a top plan view of an airbag assembly 700 in a deployed state or an expanded state. The airbag assembly 700 comprises an airbag housing 704. As illustrated, the airbag housing 704 comprises a first inflator 714 coupled to or in fluid communication with a first airbag 710 and a second inflator 724 coupled to or in fluid communication with a second airbag 720. In some embodiments the airbag housing 704 may comprise a single inflator, for example a dual-stage inflator, wherein the inflator is coupled to or in fluid communication with each of the first airbag 710 and the second airbag 720. A single inflator, in some embodiments, may be configured to independently deploy or inflate each of the first airbag 710 and the second airbag 720.

Referring again to FIG. 8, the first airbag 710 and the second airbag 720 are coupled together at or adjacent a rear portion of each of the first airbag 710 and the second airbag 720 via a panel 730. As discussed above, the first airbag 710 and the second airbag 720 may be coupled via one or more membranes, panels, nets, tethers, and/or stitching. In some embodiments the first airbag 710 and the second airbag 720 may be coupled via a substantially thin inflatable membrane, wherein the thin inflatable membrane is an extension of or in fluid communication with one or both of the first airbag 710 and/or the second airbag 720. The thin inflatable membrane may further couple the first airbag 710 and the second airbag 720. Configurations wherein one or more membranes, panels, nets, tethers, and/or stitching couple the first airbag 710 and the second airbag 720 may allow for or enable increased lateral coverage by the airbag assembly 700 in a deployed state or an expanded state without increasing, or substantially increasing, the volume of the first airbag 710 and/or the second airbag 720. For example, as depicted in FIG. 8, a gap 706 is present between the first airbag 710 and the second airbag 720. The gap 706 is not configured to be inflated with an inflation gas; however, the panel 730 can couple to and be supported by each of the first airbag 710 and the second airbag 720 to span the gap 706. The panel 730 thereby increases the lateral distance covered by the first airbag 710 and the second airbag 720. The gap 706 may provide a pocket to receive an occupant, particularly an occupant moving in an oblique direction relative to the direction of travel. Deployment of the first airbag 710 and the second airbag 720 from the same housing allows coupling together of the first airbag 710 and the second airbag 720 via the panel 730, and/or other similar interactions between the first airbag 710 and the second airbag 720.

In some embodiments, a low-output inflator (for example, a single-stage inflator in comparison to certain dual-stage inflators) may improve the effectiveness of the airbag assemblies in a collision event comprising out-of-position occupants. In certain embodiments, a sequential or staggered inflation of a first airbag and a second airbag may also improve the effectiveness of the airbag assemblies in a collision event comprising out-of-position occupants. For example, as discussed above, the second airbag may deploy or inflate prior to the deployment or inflation of the first airbag. As such, the second airbag may move an out-of-position occupant away from or out of a deployment path of the first airbag. In some embodiments, the second airbag may deploy or inflate with less force than the deployment or inflation of the first airbag, and vice versa.

In various embodiments, the volume of one or both of the first airbag and the second airbag may be less than certain other airbags. Reduction of the airbag volume may also reduce airbag fill time or inflation time. A reduced fill time or inflation time may provide earlier cushioning or restraint for a vehicle occupant relative to an airbag with a larger volume and consequently a longer fill time or inflation time. The size and/or inflation time of the first airbag and the second airbag can also be modified such that energy loss (i.e., from the airbag assembly) is decreased or minimized during deployment (i.e., during unfolding) of the first airbag and/or the second airbag.

The presence of independent inflators and independent airbags may allow for enhanced adjustment or tuning of the deployment of an airbag assembly relative to an airbag assembly comprising a single airbag and/or single inflator. For example, an inflation triggering time of the first airbag may be modifiable relative to an inflation triggering time of the second airbag. Additionally, the sequence of deployment or inflation of each of the first airbag and the second airbag may be modified. For example, as discussed above, the second airbag may be configured to deploy or inflate prior to deployment or inflation of the first airbag under some circumstances, and vice versa. The inflation triggering time and/or the sequence of airbag deployment, as described, may be adjusted, configured, or modified based on different inputs such as crash pulse, seatbelt use, etc.

Adjustment and tuning capabilities of an airbag assembly comprising a first airbag, a second airbag, and an inflation assembly may also be enhanced relative to other airbag assemblies due to factors including, but not limited to, independent airbag volumes, shapes, sizes, venting, internal air pressures, etc. Further, a lack of fluid communication between the first airbag and the second airbag may allow or enhance the ability to adjust or tune various inflation characteristics of the first airbag and the second airbag in relation to certain airbags.

Much of the foregoing disclosure has focused on passenger airbags. It should be understood that airbag features disclosed herein may be used with other types of airbags, as previously mentioned. For example, in some embodiments, driver airbags can include primary and secondary airbags such as disclosed herein.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112(f). It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An airbag assembly comprising:
   a housing configured to be mounted in a vehicle at a first position;
   an inflator assembly;
   a first airbag that defines a first inflatable chamber that is configured to receive inflation gas from the inflator assembly to expand the first airbag from a packaged state to a deployed state, wherein the first airbag is configured to deploy from the housing, and wherein the first airbag is configured to receive a torso of a vehicle occupant when the vehicle occupant moves from a vehicle occupant position primarily in a forward direction relative to the vehicle;
   a second airbag that defines a second inflatable chamber that is configured to receive inflation gas from the inflator assembly to expand the second airbag from a packaged state to a deployed state, wherein the second airbag is configured to deploy from the housing to cover a region of the vehicle that is at a second position that is spaced from the first position; and
   an inflatable panel coupled at a vehicle occupant facing portion of each of the first airbag and the second airbag, wherein the inflatable panel is in fluid communication with at least one of the first airbag and the second airbag.

2. The airbag assembly of claim 1, wherein the first airbag is configured to deploy from the housing in a first direction toward the vehicle occupant position, and wherein the second airbag is configured to deploy from the housing in a second direction.

3. The airbag assembly of claim 1, wherein the inflatable panel is configured to receive the torso of the vehicle occupant when the vehicle occupant moves from the vehicle occupant position primarily in an oblique direction relative to the vehicle.

4. The airbag assembly of claim 1, wherein the inflatable panel spans a gap between the first airbag and the second airbag.

5. The airbag assembly of claim 1, wherein the second airbag is further coupled to the first airbag via a tether.

6. The airbag assembly of claim 1, wherein the inflator assembly comprises a first inflator coupled to the first airbag and a second inflator coupled to the second airbag.

7. The airbag assembly of claim 6, wherein each of the first inflator and the second inflator is a single-stage inflator.

8. The airbag assembly of claim 1, wherein the inflator assembly comprises a dual-stage inflator, and wherein a first stage of the dual-stage inflator is coupled to the first airbag and a second stage of the dual-stage inflator is coupled to the second airbag.

9. An airbag assembly comprising:
   a housing configured to be mounted in a dashboard of a vehicle;
   an inflator assembly at least partially disposed within the housing;
   a primary airbag coupled to the inflator assembly and defining a first inflatable chamber to receive inflation gas from the inflator assembly to expand the primary airbag from a packaged state to a deployed state, wherein the primary airbag is configured to deploy directly in front of and toward a vehicle occupant position; and
   a supplemental airbag coupled to the inflator assembly and defining a second inflatable chamber to receive inflation gas from the inflator assembly to expand the supplemental airbag from a packaged state to a deployed state, wherein the supplemental airbag is configured to deploy from the housing inboard lateral to and adjacent the primary airbag, such that a rear face of the supplemental airbag in the deployed state is positioned lateral of the vehicle occupant position, wherein a volume of the supplemental airbag is less than a volume of the primary airbag, and wherein the supplemental airbag is configured to receive a head of a vehicle occupant when the vehicle occupant moves from the vehicle occupant position primarily in an oblique direction relative to the vehicle.

10. The airbag assembly of claim 9, wherein the supplemental airbag is configured to deploy prior to the primary airbag, such that the deployed supplemental airbag at least partially directs a direction of deployment of the primary airbag.

11. The airbag assembly of claim 10, wherein the supplemental airbag at least partially supports the deployed primary airbag.

12. The airbag assembly of claim 9, wherein the supplemental airbag in the deployed state is disposed lateral of the vehicle occupant position toward an outside of the vehicle relative to the primary airbag.

13. The airbag assembly of claim 9, wherein the supplemental airbag in the deployed state is disposed lateral of the vehicle occupant position toward an inside of the vehicle relative to the primary airbag.

14. The airbag assembly of claim 9, wherein an internal air pressure of the deployed supplemental airbag is greater than an internal air pressure of the deployed primary airbag.

15. The airbag assembly of claim 9, the inflator assembly comprising a first inflator and a second inflator, wherein the first inflator is in fluid communication with the primary airbag, and wherein the second inflator is in fluid communication with the supplemental airbag.

16. The airbag assembly of claim 9, further comprising a panel to couple the supplemental airbag to the primary airbag and to span a gap between the primary airbag and the supplemental airbag.

* * * * *